United States Patent [19]

Borden

[11] Patent Number: 5,055,698

[45] Date of Patent: * Oct. 8, 1991

[54] REAL-TIME PARTICLE SENSOR FOR DISK DRIVES

[75] Inventor: Peter Borden, Palo Alto, Calif.

[73] Assignee: High Yield Technology, Inc., Sunnyvale, Calif.

[*] Notice: The portion of the term of this patent subsequent to Jan. 23, 2007 has been disclaimed.

[21] Appl. No.: 504,155

[22] Filed: Apr. 3, 1990

[51] Int. Cl.⁵ .......................................... G01N 15/06
[52] U.S. Cl. .................................... 250/574; 356/339
[58] Field of Search .................. 250/574, 573, 571; 356/338, 339, 343

[56] References Cited

U.S. PATENT DOCUMENTS

| | | | |
|---|---|---|---|
| 3,672,775 | 6/1972 | Fruengel | 356/339 |
| 4,571,079 | 2/1986 | Knollenberg | 356/339 |
| 4,685,802 | 8/1987 | Saito et al. | 356/339 |
| 4,739,177 | 4/1988 | Borden | 250/574 |
| 4,804,853 | 2/1989 | Borden et al. | 250/574 |
| 4,896,048 | 1/1990 | Borden | 356/339 |
| 4,920,275 | 4/1990 | Itoh | 250/574 |

Primary Examiner—David C. Nelms
Assistant Examiner—Khaled Shami
Attorney, Agent, or Firm—Skjerven, Morrill, MacPherson, Franklin & Friel

[57] ABSTRACT

A real-time particle sensor is provided which can monitor particles near the surface of a disk in a computer disk drive system and in the region between disks in a multiple disk stack. A laser and lens are housed in a compact cartridge which is mounted on an actuator arm of a disk. Photocells which are also mounted on the actuator arm detect light scattered by particles passing through the laser beam, and so generate an electrical signal used to count the detected particles. The sensor's small size allows a separate sensor to fit in each of the regions between adjacent disks in a stack of disks, or near the surface of a single disk.

12 Claims, 5 Drawing Sheets

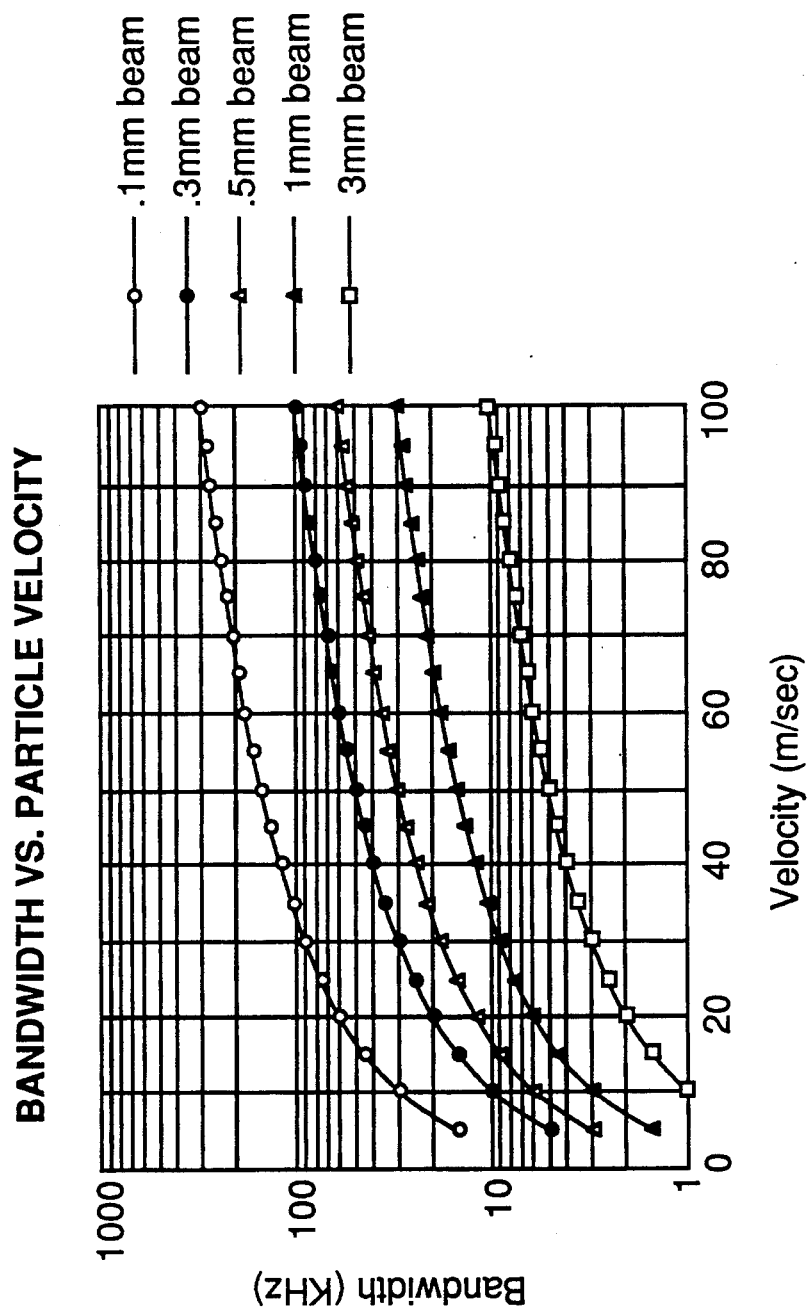

REAL-TIME PARTICLE SENSOR FOR DISK DRIVES

FIELD OF THE INVENTION

This invention relates to a compact, real-time particle sensor which can be mounted on an actuator arm of a computer disk drive.

BACKGROUND OF THE INVENTION

Particle contamination in computer disk drive systems presents serious reliability problems and must be minimized. Particles, such as metal flakes, which can be created during manufacture or from mechanical wear during operation, can damage the rapidly spinning disks and the read/write heads flying a few hundred nanometers above the surface of the disks. Particle caused damage can lead to loss of data. Consequently, it is desirable to monitor particle occurrence at the surface of the disk or between disks in a multiple disk drive, the most critical areas of the disk drive.

A prior art technique for monitoring particle occurrence in disk drives involves sampling the internal recirculating air flow of the head-disk assembly with an airborne particle counter. Such a counter draws some of that internal air through a laser beam so that a particle entrained in the air flow and passing through the laser beam will scatter light to photodetectors. If the air flow rate and the particle count is known, this technique can measure the average density of particles in the air flow.

This prior art technique for monitoring particle occurrence within sealed head-disk assemblies has serious drawbacks, however. The airborne particle counter provides a measurement remote from the disk and head surfaces so that the actual count of particles at the disk surface is not known and must be inferred. The airborne particle counter typically samples only one cubic foot of air per minute, which in many cases is too slow a sampling rate to count a statistically significant number of particles. Furthermore, this prior art technique is very insensitive to particles with a diameter greater than approximately 5 micrometers. Larger particles will not remain entrained in the air flow long enough to reach the remote laser sensing region of the airborne counter.

SUMMARY OF THE INVENTION

According to this invention, a real-time particle sensor designed for monitoring particles near the surface of a disk and in the region between two disks is provided.

A real time particle sensor according to one embodiment of this invention includes a compact laser which generates a laser beam through which particles must pass to be detected, a lens for collimating the laser beam and a beam stop for absorbing the laser beam. The sensor is mounted on an actuator arm similar to the rigid arm, typically aluminum, used to hold the read/write heads and move them to the correct position to read or write data. The sensor's small size allows it to fit in the region between adjacent disks in a stack of disks, or near the surface of a single disk. Particles are carried by the air flow caused by the rotation of the disks through the laser beam so that they scatter light to photocells which generate the electrical signals used to detect and count the particles.

Because the sensor is mounted on an actuator arm the laser beam is fully exposed to the flow of air between two disks or near the surface of a single disk, allowing the sensor to sample the largest possible air flow. In fact, a sensor according to this invention can achieve an air sampling rate typically 15 times higher than that available with prior art airborne particle counters, thus providing a more accurate particle count. In addition, this configuration causes minimum disruption of the air flow within the disk drive.

The real-time particle sensor of this invention also has the beneficial feature that the laser beam is placed very near a disk surface. In contrast to prior art airborne particle counters which provide a remote, inferred count of particles at the disk surface, this sensor provides a local, more accurate count of particles at the disk surface. Furthermore, a laser beam at the disk surface can monitor the occurrence of particles there in real-time, whereas a remote particle counter can detect particles only after they have been drawn away from the sensitive disk surface.

The sensor of this invention has the sensitivity necessary to monitor small particles, less than 3 micrometers in diameter. In addition, the placement of the laser beam near the disk allows the detection of larger particles which would otherwise not remain entrained in the airflow long enough to reach the remote laser sensing region of the prior art.

BRIEF DESCRIPTION OF THE DRAWINGS

FIG. 5 is a computer model generated graph showing the relationship of bandwidth and particle velocity.

DETAILED DESCRIPTION OF THE INVENTION

Figure 1:
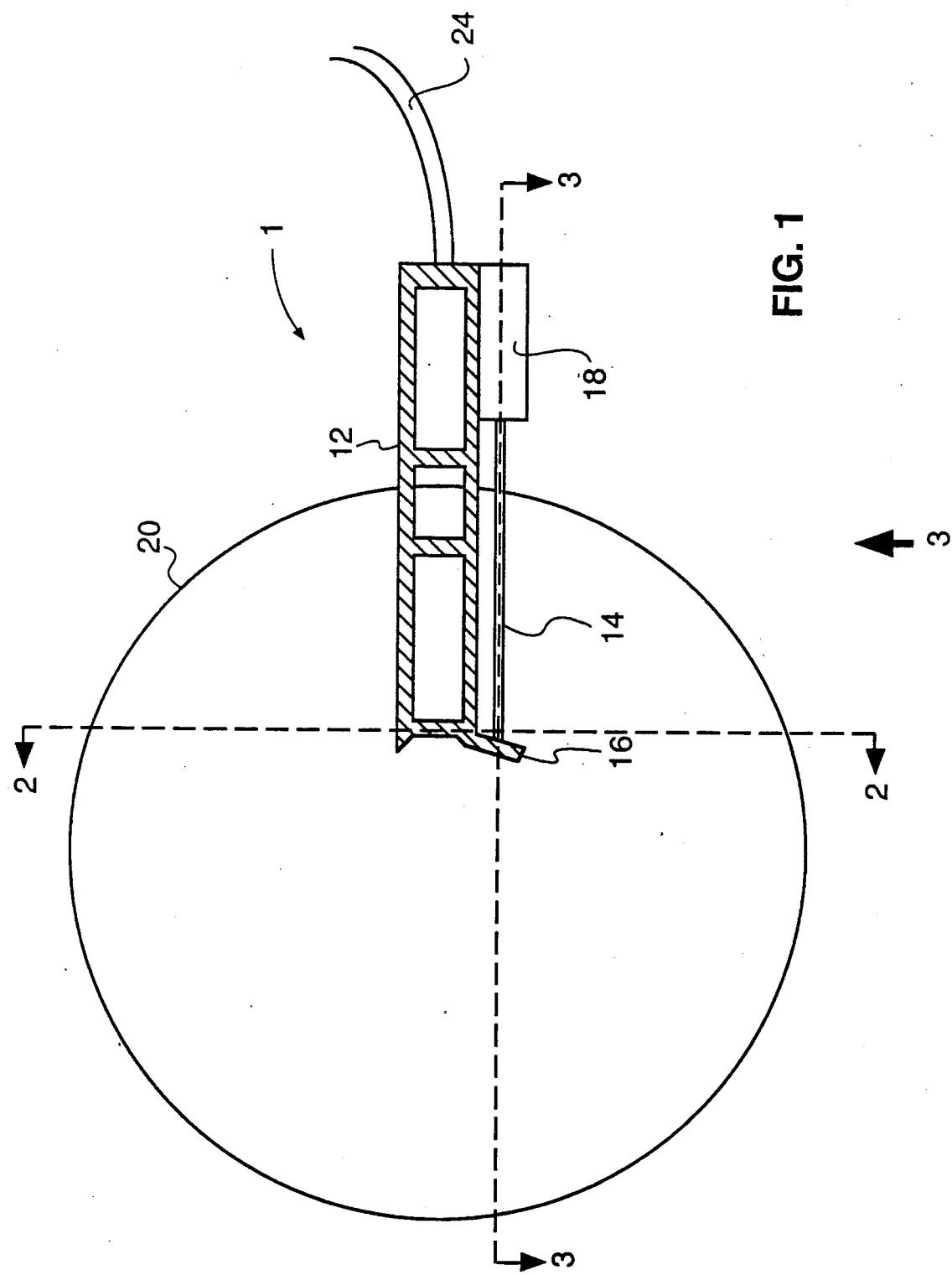
FIG. 1 shows a top view of a real-time particle sensor mounted on an actuator arm according to one embodiment of this invention.

FIG. 1 (not to scale) shows a top view of a real-time particle sensor 1, according to one embodiment of this invention, which is positioned above and partially extends over disk 20 typically having a 12 inch diameter. In another embodiment of sensor 1, a second disk, not shown, can be positioned above disk 20 and sensor 1. A cartridge 18 is mounted on the portion of an actuator arm 12 which extends outside the area directly above the disk 20. Actuator arm 12, which is similar to the arm used to hold the read/write heads, is typically rigid aluminum, about 10 cm long and 2 cm wide. A laser and a lens, not shown, are housed in the cartridge 18 which is about 2 cm long, 1 cm high and 1 cm wide. The laser is preferably a 50 milliwatt AlGaAs laser diode operating at a wavelength of 780 nanometers, commercially available in a small, transistor sized package from, for example, Sony.

The laser beam 14 is collimated with a single gradient index lens, such as a SELFOC CD pickup lens sold by Nippon Sheet Glass. The lens forms an elliptical beam with dimensions of 2.0 mm by 0.5 mm. The top view of FIG. 1 shows the 0.5 mm dimension of the beam. The cartridge 18 is mounted on the actuator arm 12 so that the collimated laser beam 14 is projected about 1 cm in front of and parallel to the arm 12. The laser beam 14 strikes a beam stop 16 supported at the far end of arm 12, where it is absorbed. The beam stop 16 can be a small piece of anti-reflection coated colored filter glass which is highly absorbent at the laser wavelength of 780 nanometers, such as BG-13 glass sold by Schott Glass Corp. of 400 York Avenue, Duryea, Penna. Electrical leads for the laser and the photodetectors (shown in FIGS. 2 and 3) are brought out of the disk drive with a Kapton flexible circuit 24.

Figure 2:
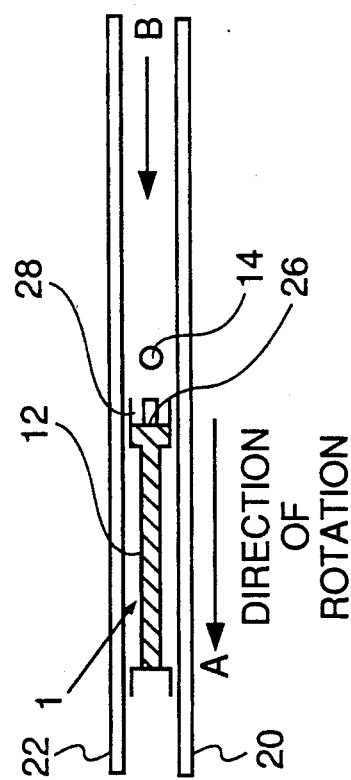
FIG. 2 shows a cross-sectional view of actuator arm 12 along the line 2—2 shown in FIG. 1.

The end view of sensor 1 along line 2—2 of FIG. 1 and shown in FIG. 2 illustrates how the sensor 1 fits between two rigid disks 20 and 22, and how laser beam 14 is projected into the space between those disks. Beam 14 sits typically 1 cm in front of the actuator arm 12. Disk rotation in a direction shown by arrow A moves the air in the space between the disks at a velocity nearly equal to the disk rotation velocity, whereby air is forced through laser beam 14 as shown by arrow B. Particles in the air flow that pass through laser beam 14 scatter light to photocells 26 which can be small silicon chip photodiodes. Typically 8 photocells 26 are mounted in groove 28 on the face of the actuator arm 12. The output signals from photocells 26 are used to detect and count particles.

Figure 2A:
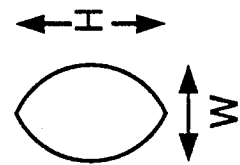

The elliptical shape of laser beam 14 as depicted in FIG. 2 is shown in FIG. 2a in which the long axis of 2.0 mm is indicated by dimension h and the short axis of 0.5 mm is indicated by dimension w. The long axis h of the beam is preferably perpendicular to the disk surface and, therefore, perpendicular to the air flow in the direction of arrow B set up by disk rotation. The elliptical shape of laser beam 14 positioned this way maximizes the amount of air flowing through it. Laser beam 14 can be centered in the space between the disks or it can be positioned nearer to either disk surface by moving the actuator arm assembly up or down. This choice of beam placement allows laser beam 14 to sample a large volume of air in the area where particle contamination is of greatest concern.

Figure 3:
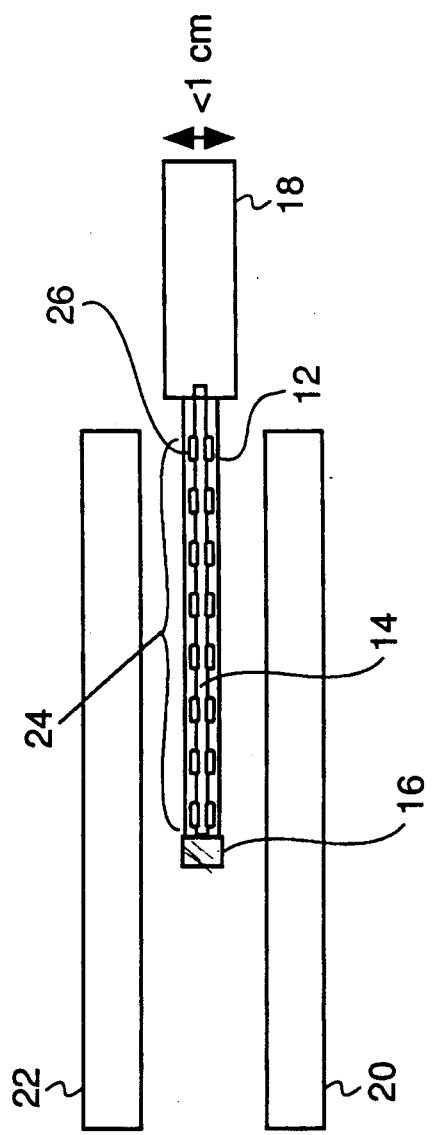
FIG. 3 shows a side view of a real-time particle sensor along line 3—3 in FIG. 1 as seen by an observer looking in the direction of arrow 3 in FIG. 1.

FIG. 3 shows a side view of the sensor 1 along line 3—3 of FIG. 1. A row of 8 photocells 26 are mounted on a Kapton flexible circuit 24 bonded to the face of actuator arm 12. An important feature of a sensor according to this invention is that it be small enough to fit in the space between two disks of a typical multiple disk drive. The largest vertical dimension of the sensor, the dimension perpendicular to the plane of the disk surface, is the height of actuator arm 12, about 0.6 cm. Since the center-to-center spacing of a typical multiple disk stack is usually greater than 1 cm, approaching 2 cm, a sensor can be placed in each space between disks of a multiple disk stack, allowing stacking of sensors. For example, a stack of 9 disks has 8 spaces which can each accommodate a sensor so that 8 sensors can be used. Use of multiple sensors greatly increases the volume of air that can be monitored, thereby improving particle counting accuracy.

When a particle carried by the air flow caused by disk rotation passes through laser beam 14, the particle will scatter light, some of which will reach photodetectors 26. Photodetectors 26 consequently generate an electrical signal which is processed by electronic circuitry such as that described in U.S. Pat. No. 4,739,177 issued Apr. 19, 1988 to Peter Borden and incorporated here by reference. In this way, particle occurrence in the region of interest is monitored.

Because a rigid disk is coated with active material only within a circumferential region extending 2.5 to 3 inches radially inward from its edge, laser beam 14 and actuator arm 12 need not extend to the center of the disk to monitor particles over the most sensitive area of the disk. The sensor 1, including laser beam 14 and photodetectors 26 need only extend radially inward as far as the active region to be effective.

The portion of the actuator arm 12 which extends over a single disk or between two disks causes minimum disruption of the air flow within a disk drive. The vertical dimension of the actuator arm 12 is small compared to the typical spacing between disks, approximately one-third to one-fourth of that spacing. Air can easily flow around actuator arm 12 which presents only a minor obstruction. Furthermore, because laser beam 14 is positioned in front of actuator arm 12 relative to the direction of airflow, air and the particles it may carry can pass through laser beam 14 before being diverted around actuator arm 12.

Figure 4:
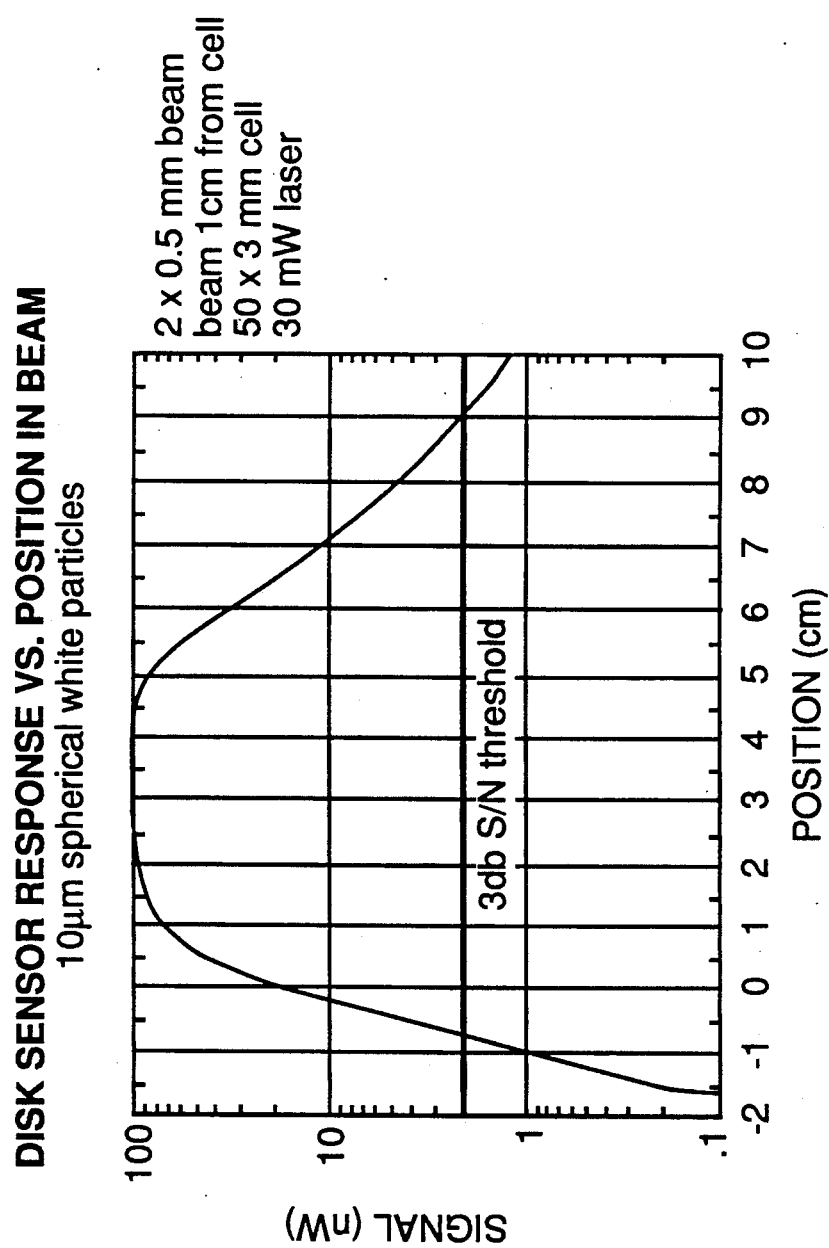
FIG. 4 is a computer model generated graph showing Sensor Response vs. Particle Position for the sensor of this invention.

The performance of the sensor has been estimated using a computer model. The results of this calculation are shown in FIG. 4. The logarithmic Y-axis of this graph shows the strength of the electrical signal in nanowatts that would be obtained from the assembly of photocells 26 mounted on Kapton flexible circuit 24, if a white spherical particle with a diameter of 10 micrometers passed through a point of laser beam 14. The zero position on the X-axis corresponds to the location along laser beam 14 at the end of the row of photocells 26 nearest the laser, with position along the x axis increasing along the length of the beam away from the laser. Positions less than zero on the X-axis correspond to locations along the beam 14 between the end of the row of photocells 26 and the laser.

FIG. 4 also shows the strength that the signal must have to be a factor of 2, or 3 decibels (dB), above an empirically determined noise level of 1 nanowatts and, therefore, measurable. An electronic noise level of 1 nanowatt is typical of the electronic noise level associated with the standard electronic circuitry used in particle sensor 1. As can be seen from FIG. 4, the response is 10 nanowatts, 5 times above the 3 decibel threshold and 10 times above the noise level of 1 nanowatt, when the particle passes through the laser beam at a position of 7 cm.

The strength of the signal is approximately proportional to the square of the diameter of the particle. On the basis of FIG. 4 then, the smallest particle that can be detected with a measurable response would have a diameter less than 3 micrometers. For instance, if a 10 micrometer particle passing through the laser beam at a position corresponding to 3.5 cm in FIG. 4 generates an electrical signal of approximately 100 nanowatts, a 3 micrometer particle passing through the laser beam at the same position will generate an electrical signal of approximately 9 nanowatts. Since a sensor according to this invention can measure a response less than 9 nanowatts, the sensor can detect a particle with a diameter less than 3 micrometers. To achieve the greatest sensitivity toward small particles above the active region of a disk, it is possible to position the sensor so that the region of the laser beam 14 which will generate the strongest signal when a particle traverses it, the region from 2 to 5 cm in FIG. 4, is directly above the active region of the disk.

It is possible to estimate the volume of air per minute that can be sampled by a sensor according to this invention. The air velocity in the region between two disks will be approximately equal to the rotational speed of the disks. If the disks have a radius of 6" and rotate at 3600 revolutions per minute, a laser beam with a length of 5 cm and a vertical dimension h of 2 mm will sample approximately 15 cubic feet of air per minute. In a disk drive with nine disks using 8 sensors, 120 cubic feet of air per minute can be sampled. By way of comparison, prior art airborne particle counters sample only 1 cubic foot of air per minute at a point well removed from the space between the disks.

Another important feature of a sensor according to this invention is its sensitivity toward particles with a high velocity, as is necessary to sample a large volume of air per minute, as described above. The shorter the time a particle spends traversing a laser beam, the shorter the pulse of scattered light that will be produced and, therefore, the greater the frequency, or bandwidth, of the generated electrical signal. Because the noise level of that signal is proportional to the square root of the bandwith, the shorter the time a particle spends traversing a laser beam, the greater the noise level of the generated signal. Consequently, any particle sensor will inherently be less sensitive to particles with a high velocity. FIG. 5 is a computer model generated graph of bandwidth in kilohertz vs. particle velocity in meters per second for beam widths w, the beam axis parallel to the air flow direction, ranging from 0.1 mm to 3 mm. The graph illustrates that a faster moving particle generates an electrical signal with a greater bandwidth and, therefore, more noise because the noise level is proportional to the square root of the bandwidth. The graph also illustrates, however, that a larger beam width can compensate for this effect and decrease the bandwidth and, therefore, the noise level.

To combat the inherent drawback of decreased sensitivity to particles with a high velocity, the particle sensor of this invention provides a relatively large beam so that the detected particles will take more time to traverse the beam. A beam width w of 0.5 mm provides a satisfactory noise level for the sensor of this invention. An elliptical beam provides a tradeoff when determining the most advantageous beam dimensions. A long axis h perpendicular to the disks will sample a larger volume of air while a long axis parallel to the disks will provide a wider beam for the particles to traverse.

Due to its compact size and inexpensive manufacturing cost, a real-time particle sensor according to this invention is practical for high volume use. For example, the sensor can be used to detect an increase in contamination within a sealed disk drive unit. This might provide a warning of performance problems before they result in a loss of data.

I claim:

1. A particle sensor for a computer disk drive comprising:
   an arm;
   means, mounted on said arm, for providing a high intensity light beam; and
   photosensor means mounted on said arm for sensing light scattered when particles pass through said beam.

2. A particle sensor according to claim 1 wherein the vertical dimensions of said sensor are such that a portion of said sensor can fit between two disks of said disk drive when said disks are properly stacked for operation.

3. A particle sensor according to claim 2 wherein the largest vertical dimension of said sensor is less than 2 cm.

4. A particle sensor according to claim 1 wherein said means, mounted on said arm, for providing said high intensity light beam comprises a cartridge containing a source of said light beam and a lens for collimating said light beam.

5. A particle sensor according to claim 4 wherein said lens produces an elliptically shaped light beam having a height "h" and a width "w".

6. A particle sensor according to claim 4 wherein said largest vertical dimension of said sensor is less than 1 cm.

7. A particle sensor according to claim 1 wherein said photosensor means comprises a plurality of photodiodes.

8. A particle sensor according to claim 7 wherein:
   said arm has a longitudinal axis;
   said means, mounted on said arm, for providing a high intensity light beam, is positioned such that said beam propagates parallel to the longitudinal axis of said arm; and
   said photodiodes are arranged in a row along said arm extending parallel to said beam.

9. A particle sensor according to claim 1 wherein said arm is an actuator arm of the type used to hold read/write heads.

10. A particle sensor according to claim 1 wherein said means for providing a high intensity light beam is a laser diode.

11. A particle sensor according to claim 8 wherein said beam is unenclosed by said arm whereby said arm obstructs said particles from traversing said beam in only one direction.

12. A particle sensor according to claim 11 further comprising a beam stop mounted on said arm.

* * * * *